Figure 1:
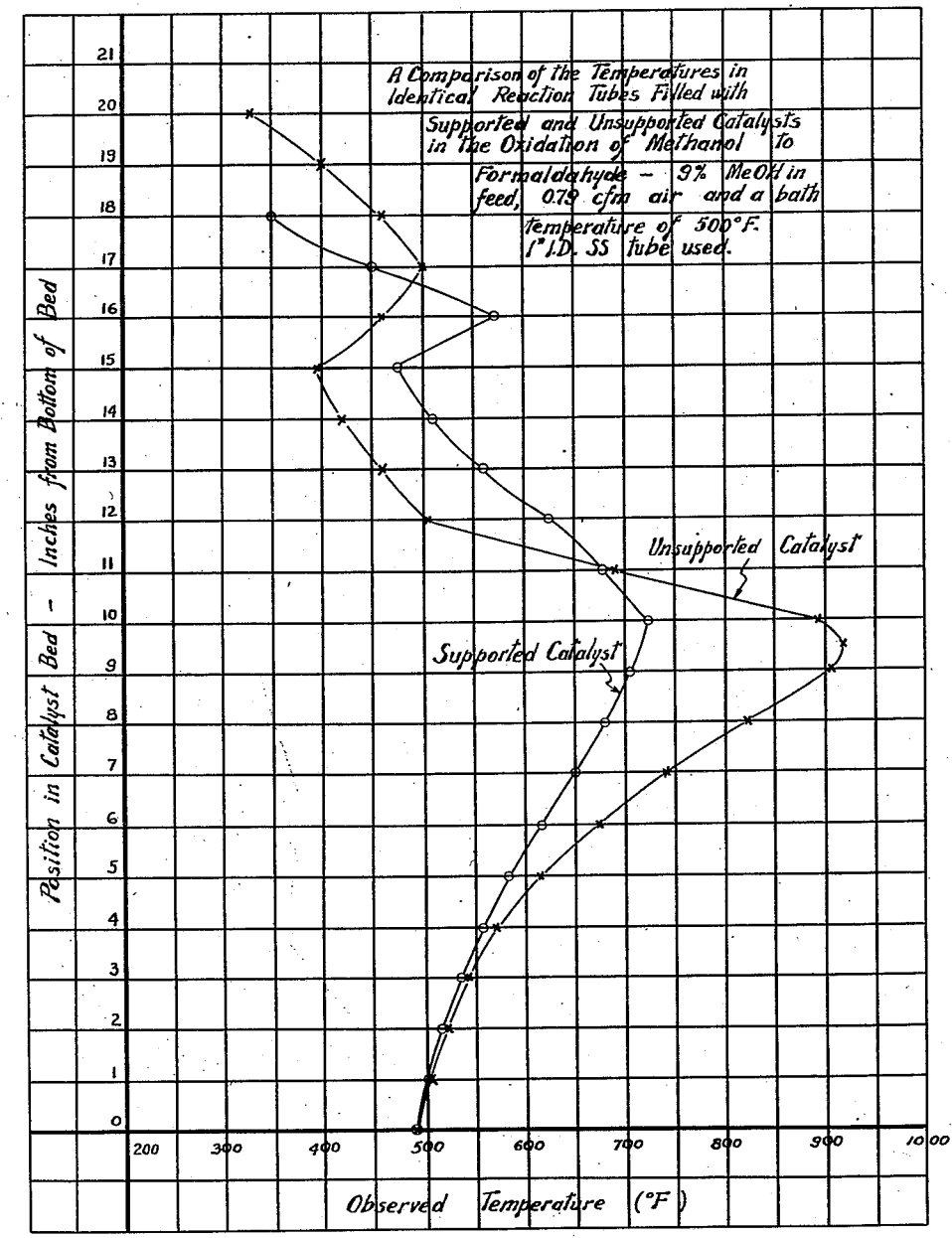

INVENTORS
FREDERIC J. SHELTON
EUGENE M. BARRENTINE
BY
ATTORNEY

Nov. 5, 1957
F. J. SHELTON ET AL
2,812,308
METHOD FOR PRODUCING SUPPORTED CATALYST FOR
OXIDATION OF ALCOHOLS TO ALDEHYDES
Filed Aug. 27, 1954
2 Sheets-Sheet 2
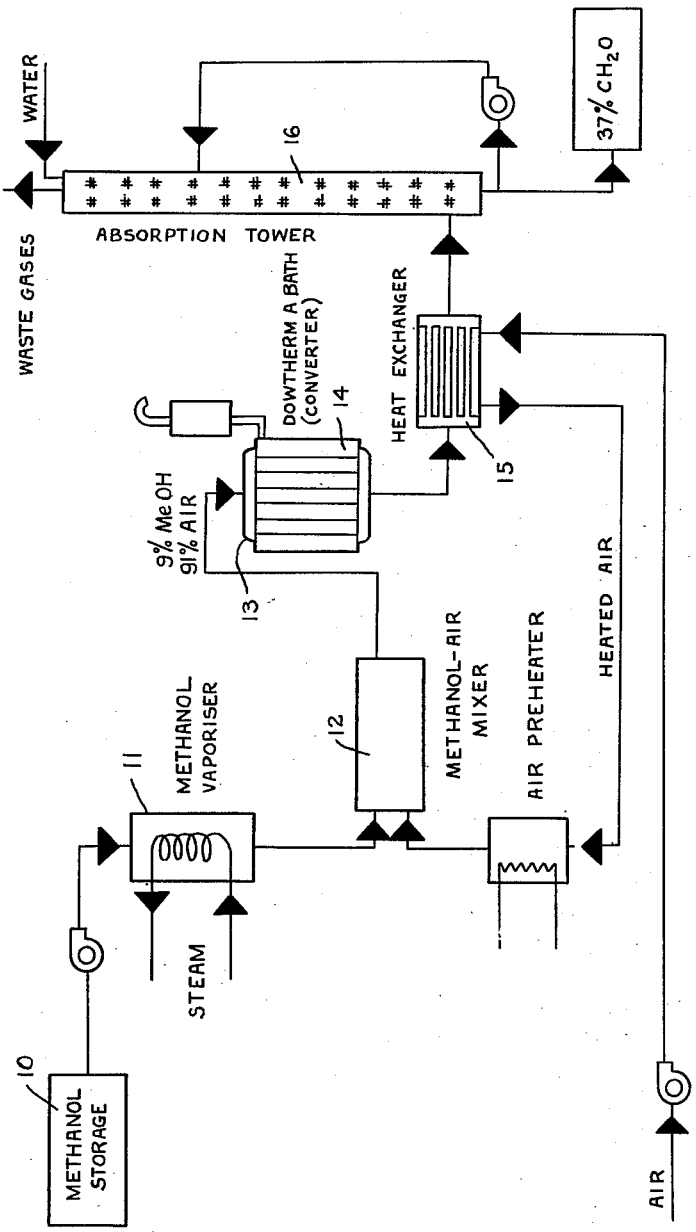
FIG. 2. FORMALDEHYDE FLOW SHEET
INVENTORS
FREDERIC J. SHELTON
EUGENE M. BARRENTINE
BY Munson Hare.
ATTORNEY

2,812,308

METHOD FOR PRODUCING SUPPORTED CATALYST FOR OXIDATION OF ALCOHOLS TO ALDEHYDES

Frederic J. Shelton and Eugene M. Barrentine, Seattle, Wash., assignors to Reichhold Chemicals, Inc., Detroit, Mich.

Application August 27, 1954, Serial No. 452,685

5 Claims. (Cl. 252—438)

The invention relates to a process for the production of aldehydes by catalytic oxidation of alcohols, to an improved active catalyst for use in such process, to the method of forming such catalyst from an inactive precursor, and especially to the inactive catalyst precursor and to the method of producing the same.

More particularly this invention relates to an improved iron molybdenum oxide catalyst precursor particularly suitable for the manufacture of an active catalyst useful in the production of aldehydes such as formaldehyde, acetaldehyde, butyraldehyde and the like, by oxidation in the vapor phase using the corresponding alcohols.

Our active catalyst is also useful for the production of substituted aldehydes such as di-aldehydes from glycols, glyoxylic acid from glycollic acid, and the like.

The catalyst precursor is not in itself suitable for direct use as a catalyst for the oxidation of alcohols to aldehydes, but becomes a very efficient catalyst when converted to active catalyst within the alcohol converter. In our process an alcohol is vaporized, mixed with air, and passed through a converter containing catalyst packed tubes heated to a suitable conversion temperature. The processed gases are then cooled to recover the products. Heretofore it has been necessary to prepare a catalyst at the site of use in order to cut down on handling of the more or less fragile catalyst material. For the first time, in practicing our invention, it is possible to prepare supported catalyst precursor in one city and ship the rugged catalyst precursor to a plant located in another city for final installation and conversion to an active catalyst in an aldehyde producing plant.

Our catalyst differs from previous iron oxide-molybdenum oxide catalysts in being supported on a suitable non-metallic carrier, preferably sintered silicon carbide. We have investigated many catalyst carrier supports, such as steel ball bearings, steel nuts, sintered aluminum oxide, pelletized silicon dioxide, crystalline silicon carbide, sintered silicon carbide, crystalline tungsten carbide, sintered iron carbide and sintered iron oxide. Of these only the carbides and sintered iron oxide are satisfactory, silicon carbides being preferred, and the best form of silicon carbide is the sintered material. A particularly good grade of sintered silicon carbide is that manufactured by the Carborundum Company and is designated as Carborundum Brand, Poly Surface Pellets, Silicon Carbide, Type CMM, 6 to 10 mesh.

In preparing our catalyst we prefer to first make up a solution containing a soluble iron salt and a soluble molybdenum salt. This solution is then added to the sintered silicon carbide carrier and the mixture dried at atmospheric boiling temperature, stirring continuously during the drying period. It is important that the supported catalyst be dried adequately for ease in handling but it should not be taken to complete dryness since that produces a fragile catalyst. We have found that small amounts of water and ammonia should be present in the catalyst precursor in order to have a rugged catalyst capable of shipment by common carrier. We prefer a final moisture content in the catalyst precursor of between 2 and 25% by weight.

While we prefer to use a completely water soluble solution of iron and molybdenum it is possible to precipitate an iron-oxide molybdenum oxide mixture in the presence of the silicon carbide carrier and dry the mixture in conventional fashion. It is preferable to carry out the drying in a drier equipped with some scraping action. A rotary tunnel drier is preferred. Drying on trays with no agitation is not satisfactory due to partial separation of the iron-molybdenum oxides from the silicon carbide.

During drying the precipitate, if not agitated, tends to separate from the carrier due to particle size difference. In one stage during drying the precipitate passes through a sticky or gummy stage which forms a separate layer on the container holding the precipitate and the carrier. This layer impedes the transfer of heat, thereby lengthening out the drying time and giving more chance for separation of the precipitate from the carrier. Agitation is desirable to keep the precipitate spread uniformly over the surface of the carrier during the critical sticky drying stage, thus preventing agglomeration of coated carrier particles.

While we prefer to use ferric oxalate or ferric ammonium oxalate we find that ferric citrate, ferric ammonium citrate, ferric nitrate, ferric chloride, or any other ferric or ferrous salt having a volatile or decomposable anion is satisfactory.

Ammonium molybdate is the preferred molybdenum containing compound. However, any molybdenum containing salt having a volatile or decomposable anion or cation in combination with the molybdenum may be used.

The following is a preferred example of a high iron containing catalyst precursor:

Example 1

A coated carrier catalyst precursor was prepared as follows:

(1) 45.0 pounds of Baker's reagent grade ammonium heptamolybdate $(NH_4)_6MO_7O_{24}.4H_2O$ were dissolved in 100 pounds of distilled water and labeled solution A.

(2) 33.0 pounds of Baker's reagent grade ferric ammonium oxalate $Fe(NH_4)_3(C_2O_4)_3.4H_2O$ were dissolved in 60 pounds of distilled water and labeled solution B.

(3) 125 pounds of Carborundum Brand, Poly Surface Pellets, Silicon Carbide, Type CMM, —8+10 mesh were added to solution B in the drier.

(4) Solution A was added to solution B—carrier slurry with agitation.

(5) The resulting mixture was then boil dried to a moisture content of about 16%, with constant agitation in a steam heated mechanical drier at atmospheric pressure.

(6) The coated carrier was then dried at 220° F. for 16 hours then placed in the converter and the final drying and activation done with the catalyst in place.

This produces a coated carrier precursor of about 35% greater weight than the weight of the carrier used. Heating this precursor to 700° F. produces a 13.5% loss of volatile material. The dried coating contains a weight ratio of $Fe_2O_3/MoO_3$ of about 1:5.03 as determined by chemical analysis.

The final conditioning and activation of the catalyst was brought about by loading the catalyst into the converter and slowly increasing the converter bath temperature to about 495–510° F. in 2 hours and at the same time blowing a gentle stream of air (space velocity 50 per minute—not critical) through the catalyst bed. This blowing of air through the catalyst bed was continued at the elevated temperature until there was no further trace of ammonia or water in the exhaust gas from the converter. At this time the methanol feed was started.

With a converter tube 5/8" inside diameter containing a concentric 3/16" outside diameter thermowell, packed with the above catalyst to a height of 24.5 inches, operating at a bath temperature of 722° F. and feeding a mixture containing 1.20 cubic feet per minute of air (calculated to standard conditions of 32° F. and 1 atmosphere) and 4.42 cc./minute of methanol (about 8% methanol by weight in the feed) heated to about 350° F. before entering the catalyst bed a yield of 87.2 pounds of formaldehyde gas was obtained for every 100 pounds of methanol fed. The hot zone temperature ranged from 795° F. to 840° F.

*Example II*

The following is an example of a low iron containing catalyst precursor:

(1) 45.0 pounds of C. P. grade ammonium heptamolybdate $(NH_4)\ Mo_7O_{24}.4H_2O$ were dissolved in 100 pounds of warm distilled water in a glass lined container.

(2) 20.0 pounds of C. P. grade ferric ammonium oxalate $Fe(NH_4)_3(C_2O_4)_3.4H_2O$ were dissolved in the ammonium heptamolybdate solution of step 1 by heating gently to about 140° F.

(3) The solution from step 2 was added to 125 pounds of 6 to 8 mesh Carborundum Brand, Poly Surface Pellets, Silicon Carbide, Type CMM in the drier.

(4) The resulting mixture was then dried at atmospheric pressure to a moisture content of about 14% with constant agitation in a steam heated mechanical drier.

(5) The coated carrier was then dried for 24 hours at about 220° F.

The catalyst coating produced on the silicon carbide carrier by this method contains a weight ratio of $Fe_2O_3/MoO_3$ of approximately 1:10.25.

This catalyst was then packed in fiber drums and made ready for shipment to the operating formaldehyde plants around the country.

The final conditioning and activation of the catalyst was brought about by loading the catalyst into the converter and slowly increasing the converter bath temperature from about 70° F. to about 495–510° F. in 4 hours and blowing a gentle stream of air (space velocity 20 per minute) through the catalyst bed after a temperature of 200° F. was reached. This blowing of air through the catalyst bed was continued until all traces of ammonia and water in the exhaust gas from the converter had disappeared. The catalyst was then ready for operation and the methanol feed was started.

With a converted tube of 1 inch inside diameter containing a 3/16 inch O. D. thermowell packed with the above catalyst to a height of 23 inches, operating at a bath temperature of 500° F. and feeding a methanol air mixture containing 10% by weight of methanol at an air flow of 0.3 cubic foot per minute (STP) and heated to about 390° F. before entering the catalyst bed, a hot zone temperature of from 570 to 595° F. was generated and a yield of 86.2 pounds of formaldehyde gas was obtained for every 100 pounds of methanol fed.

*Example III*

A catalyst precursor was prepared as follows:

(1) 45.0 pounds of ammonium heptamolybdate were dissolved according to the instructions for Example II and the catalyst was prepared following the procedure for Example II, except for step 2, where 25 pounds of warm water were added to the solution from step 1 and then 60 pounds of C. P. ferric ammonium oxalate were dissolved in the resulting solution by heating gently to about 140° F.

The conditioning and activation of this catalyst was the same as Example II.

The catalyst was then ready for operation in the converter of Example II and the methanol feed was started. With a methanol-air mixture containing 16% by weight of methanol at an air flow of 1.1 cubic feet per minute (STP) per 1 inch inside diameter catalyst tube and heated to 390° F. before entering the catalyst bed, a hot zone temperature of from 695° to 724° F. was observed and a yield of 75 pounds of formaldehyde gas was obtained for every 100 pounds of methanol fed.

In a copending application, Serial No. 452,684, filed August 27, 1954 (Unsupported Catalyst and Process for Oxidation of Methanol to Formaldehyde; inventors: Allyn, Barrentine, Hodgins, Rawson and Shelton), an unsupported iron oxide-molybdenum oxide catalyst is disclosed. There are a number of important differences between the catalyst of this application and the invention of the present application. The most important difference is the economic advantage arising from the surprising fact that our supported catalyst may be used to oxidize methanol in the range from 0 to 16% by weight of methanol in the methanol-air mixture whereas the highest concentration of methanol to air suggested in application Serial No. 452,684 is 11% by weight of methanol in the methanol-air mixture. This means that if our catalyst is introduced into a plant which has been using the unsupported catalyst of Serial No. 452,684 the productive capacity of that plant may be increased by over 45% without any complicating changes in operation. This is an important economic advantage since it permits increased production without paying for increased converter capacity. In using our catalyst the capital invested in plant facilities per pound of formaldehyde produced takes a significant drop.

If in the operation of a methanol converter using an unsupported catalyst, a methanol-air mixture is used where the methanol content is above 11% the exothermic oxidation reaction which takes place within the catalyst tubes takes off explosively. This results in loss of catalyst by blowing it out of the tubes and also results in more or less damage to the equipment. With our catalyst it is possible to operate at a methanol content in the vapor of well over 11% with little danger of explosion. Only with more than 16% methanol in the feed does the danger of explosion arise. The extra safety in using our catalyst alone is sufficient reason for the commercial success of our catalyst.

We believe that the reason that our catalyst may be used to oxidize methanol-air mixtures containing from 11–16% by weight of methanol without danger of an explosion is because of the fact that lower hot zone temperatures and broader hot zones in the catalyst are generated than when the solid catalyst of Serial No. 452,684 is used. A comparison of the observed temperatures along the length of a reaction tube containing our catalyst and a reaction tube containing the unsupported catalyst of Serial No. 452,684 operating under the same conditions is shown in Fig. 1. It may be seen that the maximum temperature in the tube containing our supported catalyst was lower and the reaction zone as indicated by temperatures above 525° F. was longer than that for the unsupported catalyst.

In a given formaldehyde plant the use of supported catalyst has an important advantage over unsupported catalyst in that it costs less to fill the catalyst tubes in the converter with supported catalyst than unsupported catalyst. Using comparable raw materials an unsupported catalyst of application Serial No. 452,684 will cost about $742 per cubic foot compared to a cost of $156 per cubic foot for the catalyst supported on silicon carbide. The saving in cost of catalyst is decidedly in favor of the supported catalyst.

The silicon carbide has considerable mechanical strength which contributes largely to the enhanced mechanical strength of the supported catalyst. At the end of the useful life of the catalyst it is found in commercial practice that the level of the catalyst in the tubes has not decreased appreciably. This is evidence of the superior strength of the supported catalyst over the unsupported catalyst which usually loses about 10% volume under comparable conditions.

We have discovered that a most efficient active catalyst may be made by converting the supported catalyst precursor within the converter by a heating and blowing process. In carrying out this conversion we place the supported catalyst precursor in the catalyst tubes (usually to a depth of about 21" in a commercial converter having multiple 1" tubes arranged in parallel) and the bath surrounding the catalyst tubes is heated to a temperature between 200° C. and 300° C. and air containing no alcohol is blown through at a space velocity of about 20–80 per minute. The space velocity is not critical but should be sufficient to remove any volatile contaminants as they are formed. Heating and blowing are continued until no ammonia (if present) or water comes off. After this point is reached the active catalyst is ready for operation and a gaseous mixture of alcohol and air may be caused to flow through the hot converter to give the aldehyde.

Other methods of dehydration and ammonia removal may be employed. For example, air may be dehydrated by chemical or physical means using phosphorus pentoxide, calcium chloride, silica gel, or the like, and the resulting air passed through the catalyst at a time and temperature sufficient to remove all the water and volatiles.

The surface character of the silicon carbide is important. We have found that crystalline silicon carbide is inferior to the more porous sintered forms of silicon carbide. We have discovered that porous sintered silicon carbide having an apparent specific gravity of between 2.4 and 2.9 is most satisfactory as a carrier material. Depending on conditions and engineering design of the converter the mesh size of the silicon carbide may vary practically over a wide range from about 1 mesh to 80 mesh. The preferred mesh size is 4 to 20 mesh.

Practically we find that the ratio by weight of catalyst precursor to silicon carbide may vary between 0.20 and 0.60 with the optimum between 0.3 and 0.4.

The molar ratio of $MoO_3$ to $Fe_2O_3$ in the catalyst may vary between 3.4 and 11.1, the optimum ratio being about 6.8.

The useful space velocities which may be used with our supported catalyst may vary practically between 0 and 450 per minute with the optimum at about a space velocity of 300 per minute.

A schematic flowsheet for the process for the production of formaldehyde from methanol is shown in Fig. 2. In this process methanol is pumped from a storage tank 10 to a steam heated vaporizer 11 and the methanol vapor and air are metered by means of standard orifice plate gas flow meters into the venturi mixing chamber 12 and the hot mixed methanol-air stream is fed through the catalyst bed contained in a series of 1 inch O. D. boiler tubes four feet long inside the converter 13. A Dowtherm heat exchange medium 14 surrounds the catalyst tubes of the converter. The reacted gases from the catalyst bed pass through a heat exchanger 15 preheating the entering air. The cooled formaldehyde containing gas is then run through an absorption tower 16 and the formaldehyde is absorbed in water to yield directly a commercial 37% formaldehyde solution containing less than 1% methanol and 0.02% formic acid.

The invention has been described in detail for the purpose of illustration but it will be obvious that numerous modifications and variations may be restorted to without departing from the spirit of the invention.

We claim:

1. A process for producing an inactive supported catalyst precursor suitable for conversion into an active methanol to formaldehyde oxidation catalyst by air blowing in a formaldehyde converter, which process comprises admixing aqueous solutions of (1) ammonium molybdate, and (2) ferric ammonium oxalate, and forming therefrom a coating upon a carrier selected from a group consisting of carbides and sintered iron oxide and partially drying said coating to a moisture content of from 2 to 25% by weight of the coating, the partially dried coating having a molar ratio of $MoO_3$ to $Fe_2O_3$ of between 3.4 and 11.1.

2. A process as set forth in claim 1, wherein the carrier is silicon carbide.

3. A process as set forth in claim 1, wherein the carrier is sintered silicon carbide.

4. A process as set forth in claim 1, wherein solution (1) and solution (2) are admixed with pellets of the carrier to form a slurry.

5. A process of producing an active methanol to formaldehyde oxidation catalyst, which comprises air blowing and heating the catalyst precursor produced in accordance with claim 1 in a formaldehyde catalyst prior to introduction of formaldehyde thereto to remove moisture and any remaining gas content.

References Cited in the file of this patent
UNITED STATES PATENTS

| | | |
|---|---|---|
| 1,913,405 | Meharg | June 13, 1933 |
| 2,369,432 | Byrns | Feb. 13, 1945 |
| 2,438,369 | Levine | Mar. 23, 1948 |
| 2,584,531 | Arnold et al. | Feb. 5, 1952 |